US012694688B2

(12) United States Patent
Lee et al.

(10) Patent No.: US 12,694,688 B2
(45) Date of Patent: Jul. 28, 2026

(54) APPARATUS FOR DETERMINING SHORT DISTANCE CUT-IN TARGET

(71) Applicants: HYUNDAI MOTOR COMPANY, Seoul (KR); KIA CORPORATION, Seoul (KR)

(72) Inventors: Nam Hyung Lee, Seoul (KR); Bo Young Yun, Hwaseong-si (KR); Sung Moon Jang, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 386 days.

(21) Appl. No.: 18/240,194

(22) Filed: Aug. 30, 2023

(65) Prior Publication Data

US 2024/0161515 A1    May 16, 2024

(30) Foreign Application Priority Data

Nov. 15, 2022    (KR) ........................ 10-2022-0152661

(51) Int. Cl.
| | |
|---|---|
| *G06V 20/58* | (2022.01) |
| *G01S 17/89* | (2020.01) |
| *G01S 17/931* | (2020.01) |
| *G06V 10/77* | (2022.01) |
| *G06V 10/80* | (2022.01) |

(52) U.S. Cl.
CPC .............. *G06V 20/58* (2022.01); *G01S 17/89* (2013.01); *G01S 17/931* (2020.01); *G06V 10/7715* (2022.01); *G06V 10/80* (2022.01)

(58) Field of Classification Search
None
See application file for complete search history.

(56) References Cited

U.S. PATENT DOCUMENTS

| | | | | |
|---|---|---|---|---|
| 6,356,206 | B1 * | 3/2002 | Takenaga | .............. G01S 13/931 |
| | | | | 348/148 |
| 2018/0190016 | A1 | 7/2018 | Yang | |
| 2021/0139030 | A1 * | 5/2021 | Lee | ...................... G05D 1/0274 |
| 2021/0237779 | A1 * | 8/2021 | Das | ...................... G08G 1/0129 |
| 2021/0370968 | A1 | 12/2021 | Xiao et al. | |
| 2023/0342954 | A1 * | 10/2023 | Liang | ...................... G06T 7/246 |
| 2023/0410534 | A1 * | 12/2023 | Kanzawa | ............... G06V 20/58 |
| 2024/0412637 | A1 * | 12/2024 | Inoue | ...................... G08G 1/09 |
| 2025/0131294 | A1 * | 4/2025 | Zapf | ...................... G06V 20/56 |

FOREIGN PATENT DOCUMENTS

| | | | |
|---|---|---|---|
| CN | 111694011 | A | 9/2020 |
| KR | 10-2018-0100835 | A | 9/2018 |
| KR | 10-2020-0080403 | A | 7/2020 |
| KR | 10-2021-0003846 | A | 1/2021 |
| KR | 10-2021-0077833 | A | 6/2021 |
| WO | 2022/112433 | A1 | 6/2022 |

* cited by examiner

*Primary Examiner* — Helen Zong
(74) *Attorney, Agent, or Firm* — Morgan Lewis & Bockius LLP

(57)    ABSTRACT

An apparatus for determining a short cut-in target includes a processor, wherein the processor is configured to generate a ROI on a grid map by use of sensor information provided from a Light Detection and Ranging (LiDAR) sensor mounted on a vehicle, sets a cut-in reference line based on a sensor information on the generated grid map, and is configured to control to adjust a dynamic object fusion (DOF) track based on the set cut-in reference line.

20 Claims, 7 Drawing Sheets

APPARATUS FOR DETERMINING SHORT DISTANCE CUT-IN TARGET

CROSS-REFERENCE TO RELATED APPLICATION

The present application claims priority to Korean Patent Application No. 10-2022-0152661, filed on Nov. 15, 2022, the entire contents of which is incorporated herein for all purposes by this reference.

BACKGROUND OF THE PRESENT DISCLOSURE

Field of the Present Disclosure

The present disclosure relates to an apparatus for determining short distance cut-in target.

Description of Related Art

In general, the vehicle has been developed into an intelligent vehicle capable of providing improved fuel efficiency and performance as a means of transportation and further improved safety and convenience by use of advanced information and communication technology.

However, the intelligent vehicle includes many additional functions such as an entertainment system, an air purification device, and a convenience device, and thus the driver has to operate other supplementary operation devices in addition to the manipulation device for driving, increasing the risk of driving the vehicle due to the negligence of the driver.

Therefore, recently, various studies have been conducted on a safety device capable of preventing or avoiding a vehicle collision. The vehicle accident prevention apparatus may include an adaptive cruise control system, a forward vehicle collision warning system, a lane departure warning system, etc.

However, most of the actual traffic accidents occur at low speeds of about 30 km/h or less due to the nature of congested traffic in the city center, and thus the existing collision preventing apparatus is not suitable for accurately recognizing a target vehicle cutting in at low speeds from a short distance to prevent a collision.

For example, when the target vehicle cuts in at a low speed from a short distance, the self-driving vehicle may cause a situation determination error without accurately recognizing a situation of the target vehicle that gets in at a low speed from a short distance due to the fact that noise is included in the lateral radio detection and ranging (RADAR) information and the lateral radar information is not accurately recognized or a coasting phenomenon occurs, resulting in a vehicle collision.

Furthermore, in a current Smart Cruise Control (SCC) system, there is a problem in that a front vehicle deviating from a recognition area of a front radar and a front camera cannot be recognized.

Furthermore, there is a problem in that a situation where the other vehicle is cut-in by a short distance frequently occurs on congested roads, and in the present situation, when the front vehicle is out of the recognition area, a deceleration response is not performed, and thus a collision risk occurs.

Accordingly, there is a need to develop an apparatus for determining short distance cut-in target capable of improving reliability and safety by accurately determining various situations of a counterpart vehicle which is cut in at a low speed in the near future.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus for determining short distance cut-in target with a relatively simple cut-in judging condition, adjusting the position of a track box based on LiDAR data associated therewith, and thus outputting a highly reliable dynamic object fusion (DOF) track, solving a mismatch problem of a sensor fusion track in a short-range, cut-in situation.

Technical problems to be solved in the exemplary embodiments are not limited to the technical problems mentioned above, and other technical problems not mentioned will be clearly understood by those skilled in the art from the following description.

An apparatus, according to an exemplary embodiment of the present disclosure, includes a non-transitory computer-readable storage medium storing a program therein and a processor, wherein the processor is configured by executing the program to generate a dynamic object fusion (DOF) box based on fusion-sensor information provided from a LiDAR sensor of a vehicle and at least one non-LiDAR sensor of the vehicle, generate a grid map of a predetermined region of interest (ROI) with sensor information provided from the LiDAR sensor of the vehicle, set a reference line on the grid map based on the sensor information, and adjust the dynamic object fusion (DOF) box based on the reference line.

In at least an exemplary embodiment of the present disclosure, the processor is further configured to generate an accumulated grid map by accumulating the grid map with LiDAR contour points included thereon for multiple time frames, extract points of the vehicle from the accumulated grid map, filter noise by applying a random sampling and consensus (RANSAC) algorithm to the points of the vehicle, generate a reference line based on the points of the vehicle, and adjust the DOF box based on the reference line.

In at least an exemplary embodiment of the present disclosure, the processor is further configured to extract clustered points from the points of the vehicle using the sensor information, and control the extracted clustered points to be applied on the grid map.

In at least an exemplary embodiment of the present disclosure, the processor is further configured to cluster the points of the vehicle by each shape after preprocessing the sensor information.

In at least an exemplary embodiment of the present disclosure, the processor is further configured to perform the preprocessing by filtering and removing a point having a low intensity or reflectivity through intensity or confidence information of the sensor information, and converting the sensor information to be applied on the grid map.

In at least an exemplary embodiment of the present disclosure, the processor is further configured to generate the LiDAR contour points based on the clustered points, and extract a shape of an object based on the generated LiDAR contour points.

In at least an exemplary embodiment of the present disclosure, the processor is further configured to determine a box fitted to the shape of the object, on the grid map, and then determine information related to the box including a width, a length, a position, or a heading of the box.

In at least an exemplary embodiment of the present disclosure, the processor is further configured to determine LiDAR contour points associated with the DOF box on the grid map, and input "1" to a cell including a LiDAR contour point and/or input "0" to a cell not including a LiDAR contour point.

In at least an exemplary embodiment of the present disclosure, the processor is further configured to determine a first cell having the input of "1" and firstly encountered while searching from right to left or from the left to the right for each row on the grid map.

In at least an exemplary embodiment of the present disclosure, the processor is further configured to determine a midpoint of the first cell for each row.

In at least an exemplary embodiment of the present disclosure, the processor is further configured to set a midpoint of an frontmost first cell in a longitudinal direction with respect to the vehicle as a first point, and set a midpoint of a rearmost first cell in the longitudinal direction as a second point.

In at least an exemplary embodiment of the present disclosure, the processor is further configured to determine an intermediate value using the first point and the second point and set a reference cell among first cells based on the determined intermediate value.

In at least an exemplary embodiment of the present disclosure, the processor is further configured to set a division line in a horizontal direction or a transverse direction passing through the reference cell, and set a first sampling area located in front of the division line and a second sampling area located in rear of the division line.

In at least an exemplary embodiment of the present disclosure, the processor is further configured to determine a first sampling cell in the first sampling area and a second sampling cell in the second sampling area.

In at least an exemplary embodiment of the present disclosure, the processor is further configured to set the reference line based on the first sampling cell and the second sampling cell.

In at least an exemplary embodiment of the present disclosure, the processor is further configured to set a first area of a front-most area on the ROI, a second area disposed immediately behind the first area without being overlapped therewith, and a third area of a rearmost area on the ROI, the first, second, and third areas having smaller widths than a width of the ROI, and wherein the processor is further configured to maintain a DOF box without adjusting when its front or rear center point and a center point of a LiDAR box associated thereto is included in a remaining area of the ROI other than the first, second, and third areas.

In at least an exemplary embodiment of the present disclosure, the processor is further configured to set a predetermined area within the ROI, and perform the adjusting of the DOF box based on the reference line when its front or rear center point of the DOF box and a center point of a LiDAR box associated thereto is included in the predetermined area of the ROI.

In at least an exemplary embodiment of the present disclosure, the processor is further configured to set a first area of a front-most area on the ROI, a second area of the predetermined area disposed immediately behind the first area without being overlapped therewith, and adjust a DOF box, when its front or rear center point and a center point of a LiDAR box associated thereto is included in the first area, based on the LiDAR box.

In at least an exemplary embodiment of the present disclosure, the processor is further configured to set a third area of a rearmost area on the ROI, a second area of the predetermined area disposed immediately ahead of the third area without being overlapped therewith, and adjust a DOF box, when its front or rear center point and a center point of a LiDAR box associated thereto is included in the third area, based on a cell having the input of "1" and located closest to the vehicle.

A vehicle, according to an exemplary embodiment of the present disclosure, includes an apparatus including a non-transitory computer-readable storage medium storing a program therein and a processor, wherein the processor is configured by executing the program to generate a dynamic object fusion (DOF) box based on fusion-sensor information provided from a LiDAR sensor of the vehicle and at least one non-LiDAR sensor of the vehicle, generate a grid map of a predetermined region of interest (ROI) with sensor information provided from the LiDAR sensor of the vehicle, set a reference line on the grid map based on the sensor information, and adjust the dynamic object fusion (DOF) box based on the reference line.

The apparatus for determining a short-distance, cut-in target according to an exemplary embodiment of the present disclosure includes a simple entry condition, is configured to determine the location of a track strictly depending on the FCL Contour, and accurately grasps the track estimation Multi Sensor Fusion when in an existing short distance Cut-in by outputting a highly reliable DOF track, solving an inaccurate track estimation problem of the Multi Sensor Fusion.

Furthermore, the apparatus for determining a short-distance, cut-in target according to various exemplary embodiments of the present disclosure may be configured to generate sampling cells in each sampling area, increasing stability of the cut-in reference line fitted even with a relatively small number of times of execution.

Furthermore, in the apparatus for determining a short-distance, cut-in target according to the exemplary embodiment of the present disclosure, the stability of the fitted cut-in reference line may be improved even with a relatively small number of times of implemented, improving the reliability of the product.

Effects obtainable from the exemplary embodiment are not limited to the above-mentioned effects, and other effects not mentioned will be clearly understood by those skilled in the art from the following description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
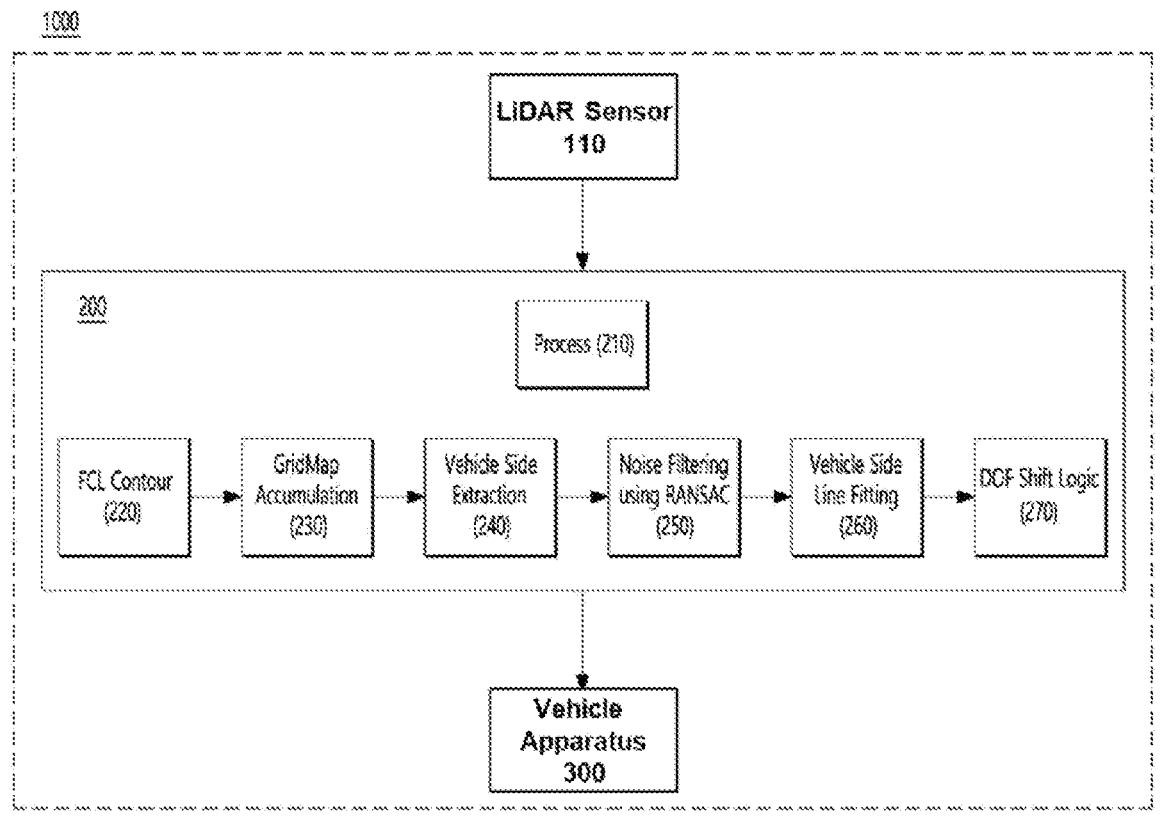
FIG. 1 is a block diagram for describing a short-range cut-in vehicle determining system according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In case where identical elements are included in various exemplary embodiments of the present disclosure, they will be provided the same reference numerals, and redundant description thereof will be omitted. In the following description, the terms "module" and "unit" for referring to elements are assigned and used interchangeably in consideration of convenience of explanation, and thus, the terms per se do not necessarily have different meanings or functions.

Furthermore, in describing the exemplary embodiments of the present disclosure, when it is determined that a detailed description of related publicly known technology may obscure the gist of the exemplary embodiments of the present disclosure, the detailed description thereof will be omitted. The accompanying drawings are used to help easily explain various technical features and it should be understood that the exemplary embodiments presented herein are not limited by the accompanying drawings.

Accordingly, the present disclosure should be construed to extend to any alterations, equivalents and substitutes in addition to those which are set out in the accompanying drawings.

Although terms including ordinal numbers, such as "first", "second", etc., may be used herein to describe various elements, the elements are not limited by these terms. These terms are generally only used to distinguish one element from another.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween.

A singular expression includes the plural form unless the context clearly dictates otherwise.

In the exemplary embodiment of the present disclosure, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

Unless otherwise defined, all terms including technical and scientific ones used herein include the same meanings as those commonly understood by one of ordinary skill in the art to which the present disclosure belongs. It will be further understood that terms, such as those defined in commonly used dictionaries, should be interpreted as having meanings consistent with their meanings in the context of the relevant art and the present disclosure, and are not to be interpreted in an idealized or overly formal sense unless so defined herein.

Furthermore, the term "unit" or "control unit", for example included in the names of a hybrid control unit (HCU), a motor control unit (MCU), etc. is merely a widely used term for naming a controller configured for controlling a specific vehicle function, and does not mean a generic functional unit. For example, each controller may include a communication device that communicates with another controller or a sensor to control a function assigned thereto, a memory that stores an operating system, a logic command, input/output information, etc., and one or more processors that perform determination, calculation, decision, etc. necessary for controlling a function assigned thereto.

Hereinafter, operation principles and embodiments of the present disclosure will be described with reference to the accompanying drawings.

FIG. 1 is a block diagram for describing a system for determining a short distance cut-in vehicle according to an exemplary embodiment of the present disclosure.

Referring to FIG. 1, a system of an exemplary embodiment for determining a short distance cut-in vehicle may include a LiDAR sensor 110 mounted in a vehicle 1000, an apparatus 200 for determining cut-in target configured to set a cut-in reference line on the grid map by use of sensor information obtained from the LiDAR sensor 110 and adjust a DOF track based on the set cut-in reference line, and a vehicle apparatus 300, e.g., a vehicle controller, configured to control various functions of the vehicle according to the adjusted DOF track output information from the apparatus 200.

The LiDAR sensor 110 may detect information such as distance to the object, a direction of the object, a speed of the object, and the like by measuring a time-length when the laser pulse flies until it returns after reflected from the object. Here, the object may be a vehicle, a person, a stationary object, or the like existing outside the vehicle.

The LiDAR sensor 110 may output the detecting result as LiDAR data or sensor information. The LiDAR data or sensor information may be in a form of point cloud data including a plurality of points.

The LiDAR sensor 110 may include a front corner LiDAR sensor (hereinafter, referred to as FCL sensor). The FCL sensor may be disposed on a front bumper or a front headlight of the vehicle.

Although not shown, the vehicle 1000 may further include one or more non-LiDAR sensors, i.e., a camera, a radar, and the like capable of detecting objects around the vehicle.

The apparatus 200 may receive sensor information from the sensors, i.e., the LiDAR sensor 110 and the one or more non-LiDAR sensors and generate a dynamic object fusion (DOF) track box based on fusion-sensor information provided from the sensors. A track may be defined as a time-history data set generated and managed in association with one object detected based on fusion-sensor information. For example, the track may include information on a box (so called 'track box') fitted to the object, a speed of the object, etc. based on the data combined from the sensors.

The apparatus 200 may include a processor 210, an FCL Contour Manufacture unit 220, a Grid Map Accumulation unit 230, a Vehicle Side Extraction unit 240, a Noise Filtering unit 250, a Vehicle Side Line Fitting unit 260, and a DOF adjustment unit 270.

Here, the individual unit may include a processor and a non-transitory computer-readable storage medium for performing its functionality described below. Also, the units and/or the processor 210 may be integrated into one unit which includes a processor and a non-transitory computer-readable storage medium. The processor may be a computer, a microprocessor, a CPU, an ASIC, a circuitry, logic circuits, etc., and also the computer-readable medium may include all types of recording devices in which data readable by a computer system is stored. Examples of the computer-readable medium include a Hard Disk Drive (HDD), a solid-state drive (SSD), a silicon disk drive (SDD), a ROM, a RAM, a CD-ROM, a magnetic tape, a floppy disk, an optical data storage device, etc.

The processor 210 may generally control the apparatus 200. For example, the apparatus 200 may set a cut-in reference line by applying the data obtained from the LiDAR sensor 110 on a grid map, and may adjust the dynamic object fusion (DOF) track based on the set cut-in reference line. The cut-in reference line may be referred to as a reference line or a random sampling and consensus (RANSAC) Line. The grid map may be a map in which a region of interest (ROI) is represented by a plurality of cells. The grid map will be described later. The ROI may be identical to the field-of-view (FOV) of the LiDAR sensor 110 without being limited thereto.

The FCL Contour Manufacture unit 220 may be configured to generate an FCL contour under the control of the processor 210.

The Grid Map Accumulation unit 230 may accumulate by time a grid map to which the generated FCL contour is applied under the control of the processor 210. The grid map accumulation unit 230 may receive the FCL contour generated by the FCL contour manufacture unit 220, and accumulate a grid map to which the FCL contour is applied. The grid map accumulation unit 230 may be referred to as a map accumulator or a grid accumulator.

The Vehicle side extraction unit 240 may extract the side of the vehicle 1000 from the accumulated grid map under the control of the processor 210. The Vehicle side extraction unit 240 of the difference may receive the grid map accumulated from the grid map accumulation unit 230 and extract the cut-in reference line which may be fit to a side of the vehicle 1000 from the provided grid map. The Vehicle side extraction unit 240 may be referred to as a vehicle point extraction unit, a vehicle extraction unit, or a side surface extraction unit. The cut-in reference line will be later described in detail.

The noise filtering unit 250 may filter the noise by applying the extracted side surface of the vehicle 1000 to the random sampling and consensus (RANSAC) algorithm under the control of the processor 210. The RANSAC algorithm is well-known in the art and thus the detailed description is omitted.

The noise filtering unit 250 may receive the information related to the side surface of the provided vehicle 1000 extracted from the vehicle side extraction unit 240, and remove noise by applying the information related to the side surface of the vehicle 1000 to the RANSAC algorithm. The noise filtering unit 250 may be referred to as a noise removing unit or a filtering unit.

The vehicle side line fitting unit 260 may fit the reference line of the vehicle on the side surface data filtered so for the vehicle 1000. The vehicle side line fitting unit 260 may receive the filtered side information of the vehicle 1000 from the noise filtering unit 250, and may fit the reference line of the vehicle 1000 based on the provided side information of the vehicle 1000. The line fitting unit 260 may be referred to as a fitting unit.

The DOF adjustment (or shift logic) unit 270 may adjust the DOF box based on the reference line of the fitted vehicle 1000. The DOF adjustment unit 270 may receive the reference line from the vehicle side line fitting unit 260 and adjust the DOF box based on the reference line.

The above-described apparatus 200 may extract the points to be clustered using the LiDAR data, and may apply the extracted clustered points to the set grid map.

The apparatus 200 may preprocess the LiDAR data received from the LiDAR sensor 110 into a form that can be processed under the control of the processor 210, and then may cluster the LiDAR data by each shape.

The apparatus for determining 200 may perform a preprocessing process of filtering and removing a point having a low intensity or reflectivity through intensity or confidence information of the LiDAR data under the control of the processor 210, and then convert LiDAR data to be applied to the grid map.

The apparatus 200 may group the LiDAR data by each shape according to a predetermined rule under the control of the processor 210, and generate a cluster which is a result of the grouping. The clustering may mean a process of configured for generating each cluster by grouping points estimated to be obtained from the same object.

The apparatus 200 may be configured to generate a contour with clustered points under the control of the processor 210, and may extract a shape of an object based on the generated contour.

The apparatus 200 may detect a box fitting on the shape of an object, from the grid map under the control of the processor 210, and then generate information related to the box including the width, the length, the position, the heading, etc.

Also, the apparatus 200 may be configured to determine a cut-in vehicle based on the adjusted DOF box with high reliability, and generate a track based on the determined result. The apparatus 200 may provide the generated track to the vehicle apparatus 300.

The vehicle apparatus 300 may receive the LiDAR track from the apparatus 200 and may apply the LiDAR track to control the traveling function.

Although not shown in drawings, the vehicle apparatus 300 additionally may include a memory. The memory may store various data used by the vehicle apparatus 300, for example, input data and/or output data for a software program and commands related thereto.

The memory may store a software program for filtering noise in an FCL contour obtained from the LiDAR sensor 110 according to an exemplary embodiment of the present disclosure.

For example, the memory may store the RANSAC algorithm for filtering noise according to an exemplary embodiment of the present disclosure.

The memory may include a non-volatile memory such as a cache, a Read Only Memory (ROM), a Programmable ROM (PROM), an Erasable Programmable ROM (EPROM), an Electrically Erasable Programmable ROM (EEPROM), and/or a flash memory, and/or a volatile memory such as a Random Access Memory (RAM).

Figure 2:
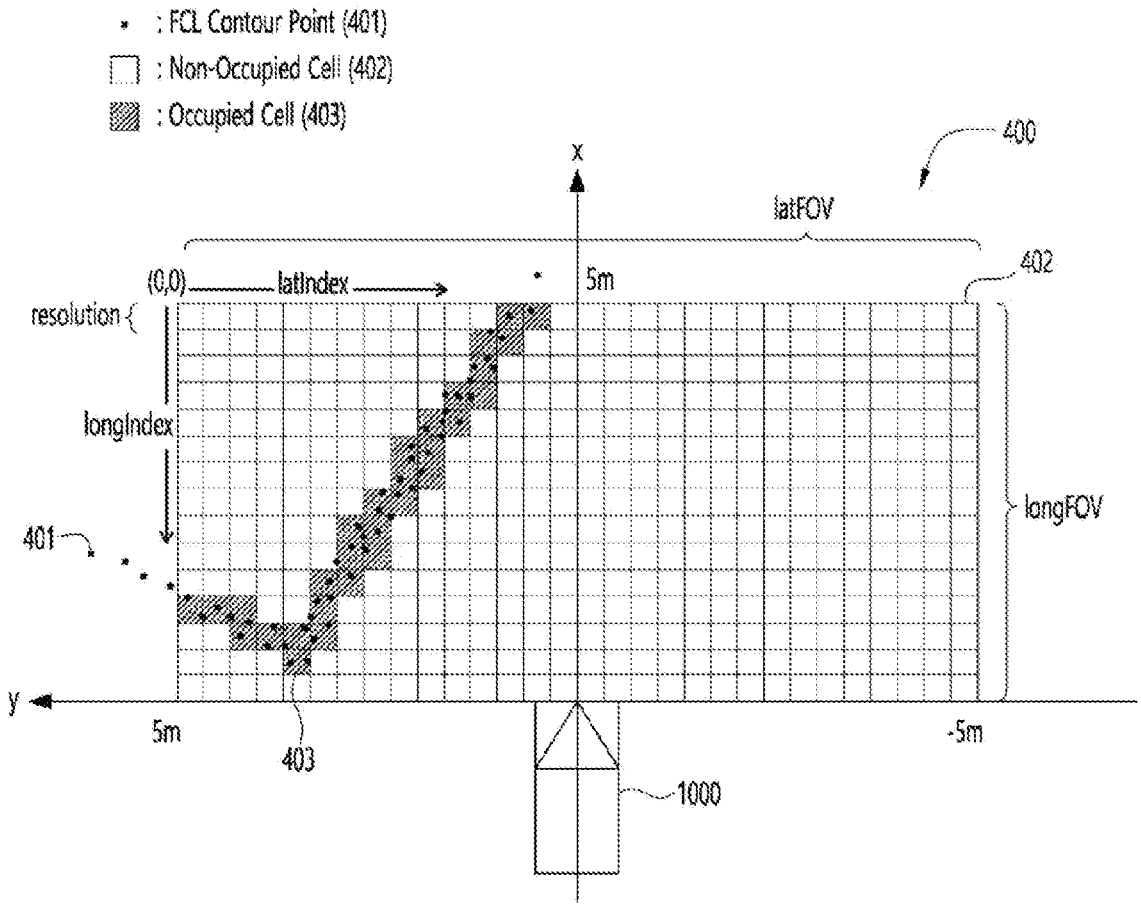
FIG. 2 is a drawing illustrating an area-of-interest grid map using FCL Contour according to an exemplary embodiment of the present disclosure.

FIG. 2 is a drawing illustrating a region-of-interest grid map on which exemplary FCL Contour points are mapped.

Referring to FIG. 2, the grid map may be a map in which the ROI is represented by the plurality of cells.

The apparatus 200 may set the ROI 400 as an area including a longitudinal dimension of longFOV in a first direction and a lateral dimension of latFOV in a second direction orthogonal to the first direction, under the control of the processor 210. Here, the first direction may be referred to as a longitudinal direction, an X direction (or axis), or a traveling direction thereof. The second direction may be referred to as a lateral direction, a Y direction (or axis), a latitude direction, or a side direction thereof.

The longFOV is 5 m, and the latFOV is 10 m in an exemplary embodiment of the present disclosure, without being limited thereof.

The ROI of the longFOV and the latFOV may be set or expressed in at least one cell on the grid and one cell may be in form of a square having a length of one side of about 33~34 cm. For example, a length of one side of the cell may be about 33.33 cm. In other words, the resolution of the grid is 33.33 cm.

The grid may include approximately 15 cells in the longitudinal direction, and approximately 30 cells in the transverse direction, without being limited thereto. In other words, the ROI may be set to approximately 15 cells in the first direction and approximately 30 cells in the second direction. However, the sizes and numbers of cells are not limited thereto, i.e., the sizes and the number of the cells including on the grid may be varied in consideration of a surrounding circumstance or an exemplary embodiment of the present disclosure.

Furthermore, the ROI may be covered by cells arranged from (0, 0) to (m, n). In the instant case, "m" may denote a longindex, i.e., an index for the longitudinal direction, "n" may denote a latindex, i.e., an index for the lateral direction, and m and n may be integers. For example, a (0, 0) cell in the ROI may be the cell which is defined by the first front-most lateral line in the first direction, the left first longitudinal line in the second direction, a second front-most lateral line in the first direction, and a left second longitudinal line in the second direction with respect to the vehicle 100. That is, the (0, 0) cell may be the first cell in the front left corner on the ROI or the grid map as illustrated in FIG. 2.

In the ROI 400, cells arranged along the first direction from the (0, 0) cell may be sequentially expressed as (1, 0) cell, (2, 0) cell, . . . , (m, 0) cell, and cells arranged along the second direction may be sequentially expressed as (0, 1) cell, (0, 2) cell, . . . , (0, n) cell.

The apparatus 200 may be configured to generate (or map) FCL contour points 401 associated with a DOF on the grid map under the control of the processor 210. In other words, the apparatus 200 may be configured to generate the FCL contour points 401 in the ROI 400 under the control of the processor 210.

The apparatus 200 may input "1" to a cell 403 including a FCL contour point 401 and may input "0" to a cell 402 not including a FCL contour point under the control of the processor 210.

A cell 403 including the FCL contour point 401 may be referred to as an occupied cell, and a cell 402 not including the FCL contour point 401 may be referred to as a non-occupied cell.

The apparatus 200 may accumulatively store data of the current time-frame and the previous four time-frames on the grid map under the control of the processor 210. For example, the apparatus 200 may accumulatively apply FCL contour points to the grid map for the five frames and determine the total cells having the input of "1" with the accumulated data. The features of the FCL contour points shown in FIG. 2 represent the data accumulated for the five frames.

In an exemplary embodiment of the present disclosure, a low-speed, short-range cut-in situation may be occurred from left to right (left→right) or from right to left (right→left), and thus two different grid maps may be stored for each scenario.

Furthermore, the apparatus 200 may be configured to determine longitudinal and lateral index values of the cell in which each of the FCL contour points 401 is positioned by use of Equation 1, wherein the origin cell of the grid map, which has 0 as both the longitudinal and lateral index values thereof, is positioned at the left upper corner as shown in FIG. 2. Also, the apparatus 200 may be configured to determine longitudinal and lateral position values of the point positioned in a cell of the grid map by use of Equation 2 below under the control of the processor 210.

$$
GridCellCenterLongIndex = \\
\mathrm{floor}\left(\frac{0.5 * longFOV}{resolution} + 0.5\right) - \mathrm{floor}\left(\frac{longPos}{resolution} + 0.5\right) - 1 \tag{Equation 1}
$$

$$
GridCellCenterLatIndex = \\
\mathrm{floor}\left(\frac{0.5 * latFOV}{resolution} + 0.5\right) - \mathrm{floor}\left(\frac{latPos}{resolution} + 0.5\right) - 1
$$

wherein GridCellCenterLongIndex denotes a longitudinal index, GridCellCenterLatIndex denotes a lateral index, longPos denotes a longitudinal position value, i.e., a longitudinal or X-axis coordinate value, and latPos denotes a lateral position value, i.e., a lateral or Y-axis coordinate value.

$$
GridCellCenterLongPos = \\
\frac{(longFOV - resolution)}{2} + resolution * (1 - longIndex) \tag{Equation 2}
$$

-continued $$GridCellCenterLatPos = \frac{(latFOV - resolution)}{2} + resolution * (1 - latIndex)$$

wherein GridCellCenterLongPos denotes a longitudinal position value of the center portion of a cell which has longIndex as its longitudinal index, and GridCellCenterLatPos denotes a lateral position value of the cell which has latIndex as its lateral index.

Equation 1 is an equation to transform position values (i.e., longitudinal and lateral coordinates) of a point into index values of the cell in which the point is positioned.

Equation 2 is an equation to transform index values of a cell in which a point is positioned into position values of the point.

A line fitting may be performed based on the positions of the midpoints of the occupied cells determined through Equations 1 and 2, which may correspond to a side surface of the target vehicle.

The above-described ROI defined by the FOVs as shown in FIG. 2 is an example where the LiDAR sensor is provided on the front bumper to view only the front region, but it is not limited thereto, and in a case in which an omnidirectional LiDAR sensor is provided, the ROI or FOV for the grid map may be expanded to an area including the rear of the vehicle 1000.

Figure 3:
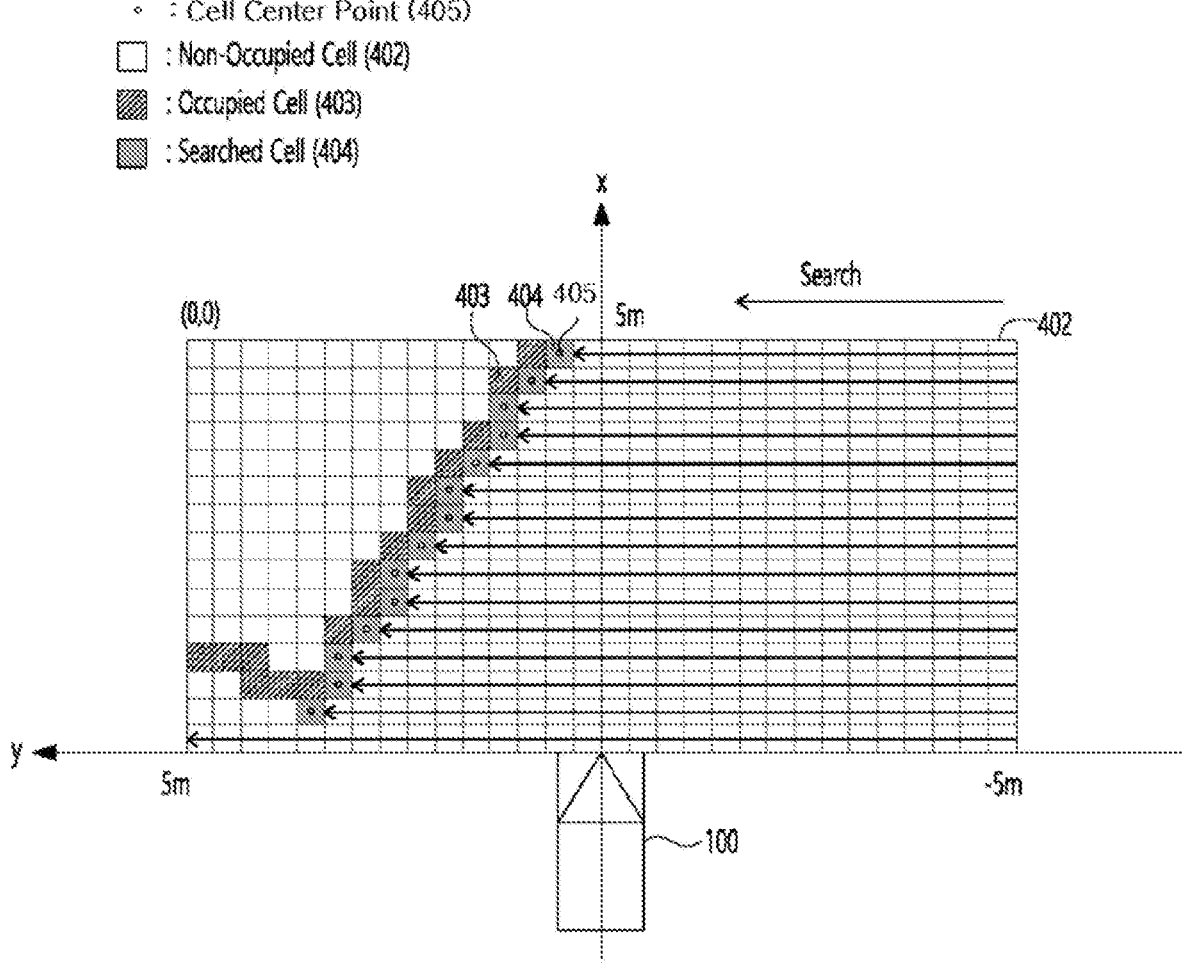
FIG. 3 is a drawing for explaining a process of searching a reference line of a vehicle on a grid map according to the exemplary embodiment of the present disclosure.

FIG. 3 is a drawing explaining a process of determining a reference line of a vehicle on the grid map according to the exemplary embodiment of the present disclosure.

Referring to FIG. 3, the apparatus 200 may search for the point of the vehicle 1000 on the grid map under the control of the processor 210. The point of the vehicle 1000 may be referred to as a vehicle-side surface point.

The apparatus 200 may search for points of the vehicle 1000 sequentially from the frontmost row to the rearmost row of the grid map under the control of the processor 210. The searching may be performed from right to left on each row of the grid map. The present disclosure is not limited thereto, and the searching may be performed from left to right. For example, in a case of a cut-in being occurred from right to left, the searching may be performed from left to right.

Referring to FIG. 3, the apparatus 200 may set as a first cell for each row a cell among the occupied cells which is firstly encountered while searching from right to left and it carries on the process from the front-most row to the rearmost one on the grid map. That is, the apparatus 200 may input a value of "1" to each occupied cell, and determine the first occupied cell by searching in a direction from right to left for each row. Here, a first cell may be referred to as a searched cell 404 as shown in FIG. 3.

When the searched cell 404 is determined, the apparatus 200 may be configured to determine and store the position of a cell midpoint 405, which is the center portion of the searched cell 404.

The apparatus 200 may connect the stored plurality of cell center points 405 to each other under the control of the processor 210, fitting the reference line of the vehicle. The reference line 408 (see FIG. 4) of the vehicle may be referred to as a cut-in reference line or a RANSAC Line.

The apparatus 200 may perform fitting of a cut-in reference line which may best represent the group of the plurality of cell center points 405 using a RANSAC algorithm. A detailed description thereof will be described later.

Figure 4:
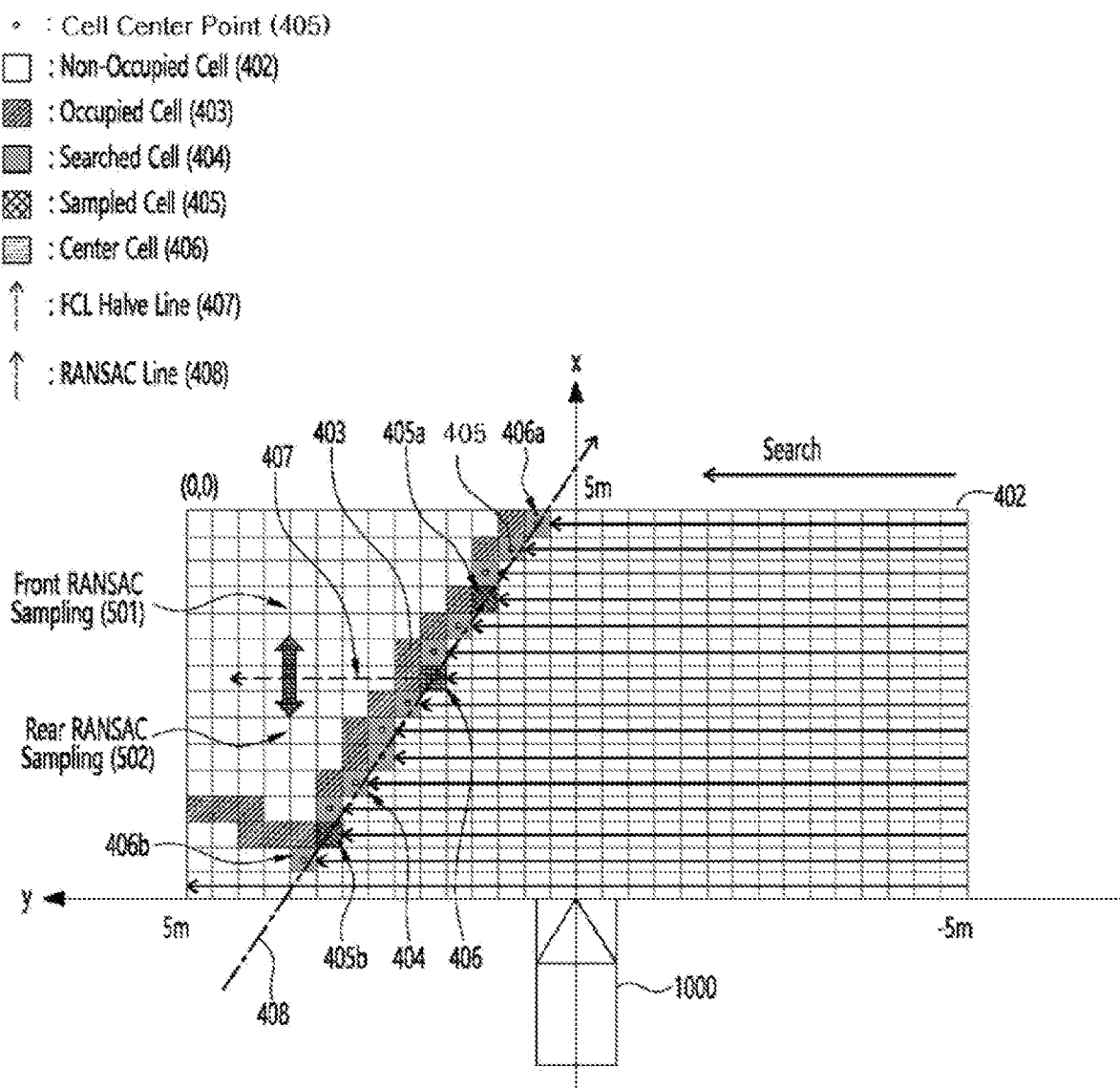
FIG. 4 and FIG. 5 are drawing for explaining a cut-in reference line of a vehicle generated by applying the RANSAC algorithm to the point of the vehicle on a grid map according to an exemplary embodiment of the present disclosure.
Figure 5:
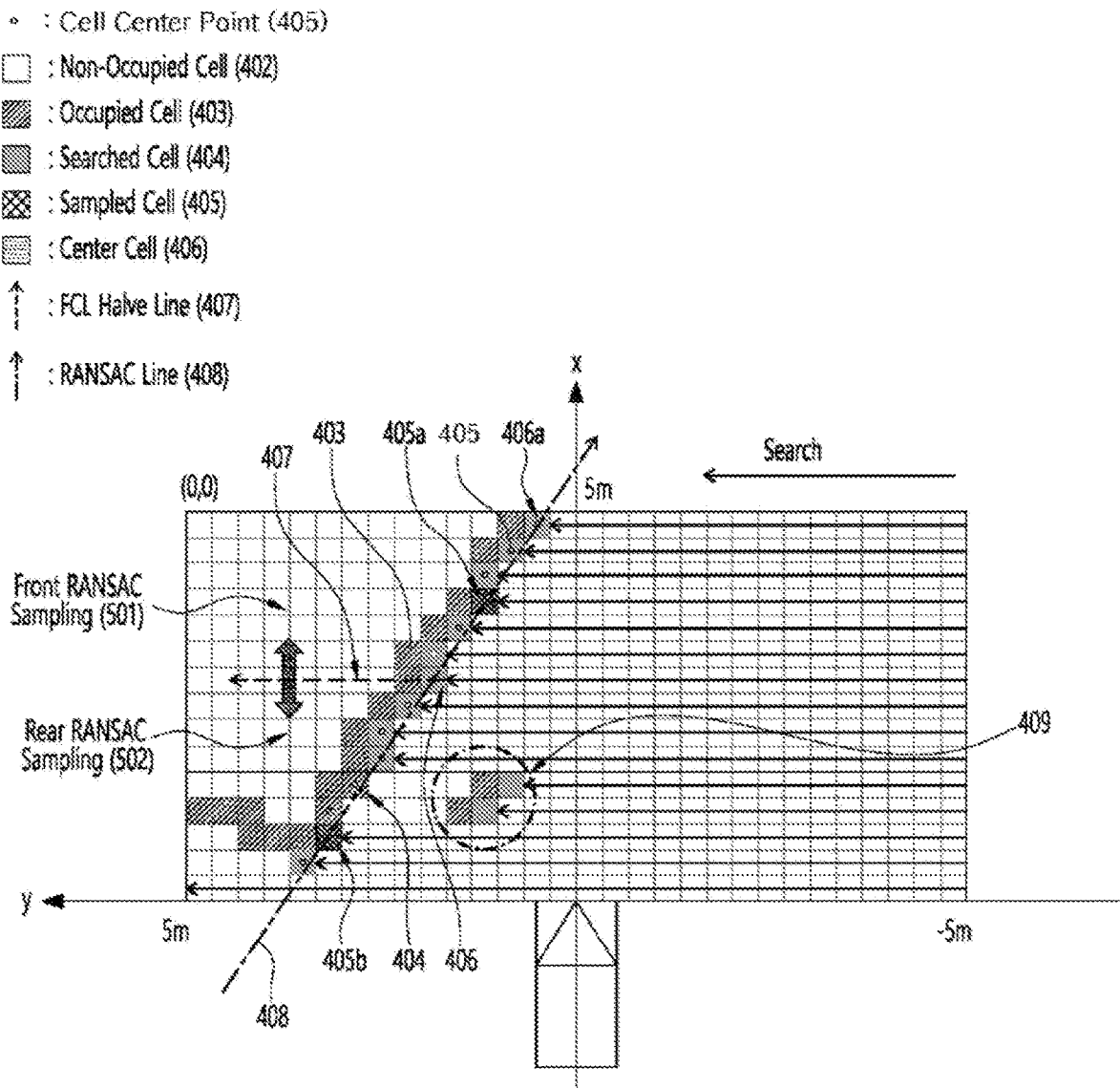

FIG. 4 and FIG. 5 are diagrams explaining a cut-in reference line of a target vehicle generated by applying the points of the vehicle to the RANSAC algorithm on the grid map according to an exemplary embodiment of the present disclosure.

Referring to FIG. 4, the apparatus 200 may set a cut-in reference line which is a reference line 408 of the vehicle with respect to the points of the vehicle 1000 under the control of the processor 210.

The apparatus 200 may sample two cells among the searched cells 404. The sampling process is detailed below.

The apparatus 200 may extract a first searched cell 404 located at a front-most position and a second searched cell 404 located at a rearmost position in the X axis under control of the processor 201 and the apparatus 200 may be configured to determine a first point 406a from the first searched cell 404 and a second point 406b from the rearmost searched cell 404 under the control of the processor 210. The first point 406a may be the cell center point 405 which is located at the top portion of the cut-in reference line 408, and the second point 406b may be the cell center point 401 which is located at the bottom portion of the cut-in reference line 408 in FIG. 4.

Thereafter, the apparatus 200 may be configured to determine an intermediate value between the first point 406a and the second point 406b under the control of the processor 210, and set a reference cell 406 based on the determined intermediate value.

The apparatus 200 may set the division line 407 in a horizontal direction or a transverse direction with respect to the set reference cell 406 under the control of the processor 210 to define the sampling areas 501 and 502. The dividing line 407 may be referred to as a FCL Halve Line.

Here, the apparatus 200 may sample one cell or one point in the first sampling area 501 and one cell or one point in the second sampling area 502.

The first sampling area 501 may be the front region with respect to FCL Halve Line, and the second sampling region 502 may be the rear region with respect to FCL Halve Line. The second sampling area 502 may be an area between the first sampling area 501 and the vehicle 1000.

The apparatus 200 may be configured to determine a sampling cell 405 in each of the first sampling area 501 and the second sampling area. For example, the apparatus 200 may be configured to determine a first sampling cell 405a and a second sampling cell 405b.

In other words, the apparatus for 200 may select the first sampling cell 405a in the front area which is the first sampling area 501, and the second sampling cell 405b in the rear area which is the second sampling area 502.

For example, when the first sampling cell 405a and the second sampling cell 405b are randomly selected in the first and second sampling areas 501 and 502 under the control of the processor 210, the apparatus 200 may be set to be biased to a portion of the first and second sampling areas 501 and 502.

As described above, when the first sampling cell 405a and the second sampling cell 405b are set to be biased to a part of the first and second sampling areas 501 and 502, a separation distance between the first and second sampling cells 405a and 405b may be shortened.

When the apparatus 200 sets the cut-in reference line 408 based on the short distance, the accuracy of the cut-in reference line 408 may be reduced.

In addition, if the apparatus 200 increases the number of times of sampling, e.g., the number of the sampling cells to increase accuracy of the cut-in reference line 408, it may cause an amount of calculation to be increased and thus the processing speed of the apparatus 200 will be slowed.

To overcome this, the apparatus 200 may divide the first sampling area 501 and the second sampling area 502 under the control of the processor 210, and may be configured to determine the first sampling cell 405a and the second sampling cell 405b in the first sampling area 501 and the second sampling area 502, respectively. The first sampling cell 405a and the second sampling cell 405b may be apart from each other by a prescribed distance of separation.

The apparatus 200 according to an exemplary embodiment of the present disclosure may be configured to determine the first sampling cell 405a and the second sampling cell 405b within the prescribed distance of separation, setting the sampling cells 405a and 405b with a relatively small number of tries, and increasing stability of the fitted reference line 408.

That is, the apparatus 200 may set the dividing line 407 which is a horizontal line with respect to the reference Center Cell 406 under the control of the processor 210 to sample the first sampling cell 405a in the first sampling area 501 and sample the second sampling cell 405b in the second sampling area 502.

Accordingly, the apparatus 200 may accurately set the fitted reference line 408 based on the first sampling cell 405a and the second sampling cell 405b which are sampled under the control of the processor 210.

Meanwhile, in the ultra-short distance region, due to the characteristics of LiDAR, a false point may be generated in the point cloud.

As illustrated in FIG. 5, while determining the searched cells 404, inclusion of false cells 409 may be occurred due to noise points.

In an exemplary embodiment of the present disclosure, false cells 409 may be removed by being filtered out through the RANSAC algorithm.

For example, the apparatus 200 may be configured to determine an average value of the position of each cell of the fitted reference lines 408 by applying the RANSAC algorithm under the control of the processor 210, and may be configured to determine that the cell is an inlier when the determined average value is included in a reference range, and may be configured to determine that the cell is an outlier when the determined average value is not included in the reference range.

If it is determined that a cell is an outlier, the apparatus 200 may be configured to determine that the outlier cell is a noise cell or a false cell 409. That is, when it is determined that the target cell is the noise cell or the false cell 409, the apparatus 200 may set the target cells as a black list and may not apply the target cells.

Accordingly, the apparatus 200 may fit the cut-in reference line only to the remaining cells except for the noise cell or the false cell 409.

For example, the apparatus 200 may obtain or determine an average value of the parameters A, B, and C of the fitted cut-in reference line for the 5 frames. The frames may be separated with a time interval of approximately 10 frames per second.

For example, the apparatus 200 may apply a low pass filter to the determined average value under the control of the processor 210, determining the values of the current frame.

Here, the apparatus 200 may apply the RANSAC algorithm under the control of the processor 210 to reflect the previous average values with a weight of 0.9 and the value of the current frame with a weight of 0.1, smoothing more than the cut-in reference line.

Although FIG. 4 and FIG. 5 described above have been described based on the case in which the LiDAR sensor 110 is provided at the front bumper of the vehicle 1000 to view only the front area of the self-driving vehicle 1000, the present disclosure is not limited thereto, and the LiDAR sensor 110 may be provided at the rear bumper of the self-driving vehicle 1000 or at the left and right sides of the vehicle 1000 to be applied to all of the rear area of the self-driving vehicle 1000 or the surrounding area of the vehicle 1000.

Figure 6:
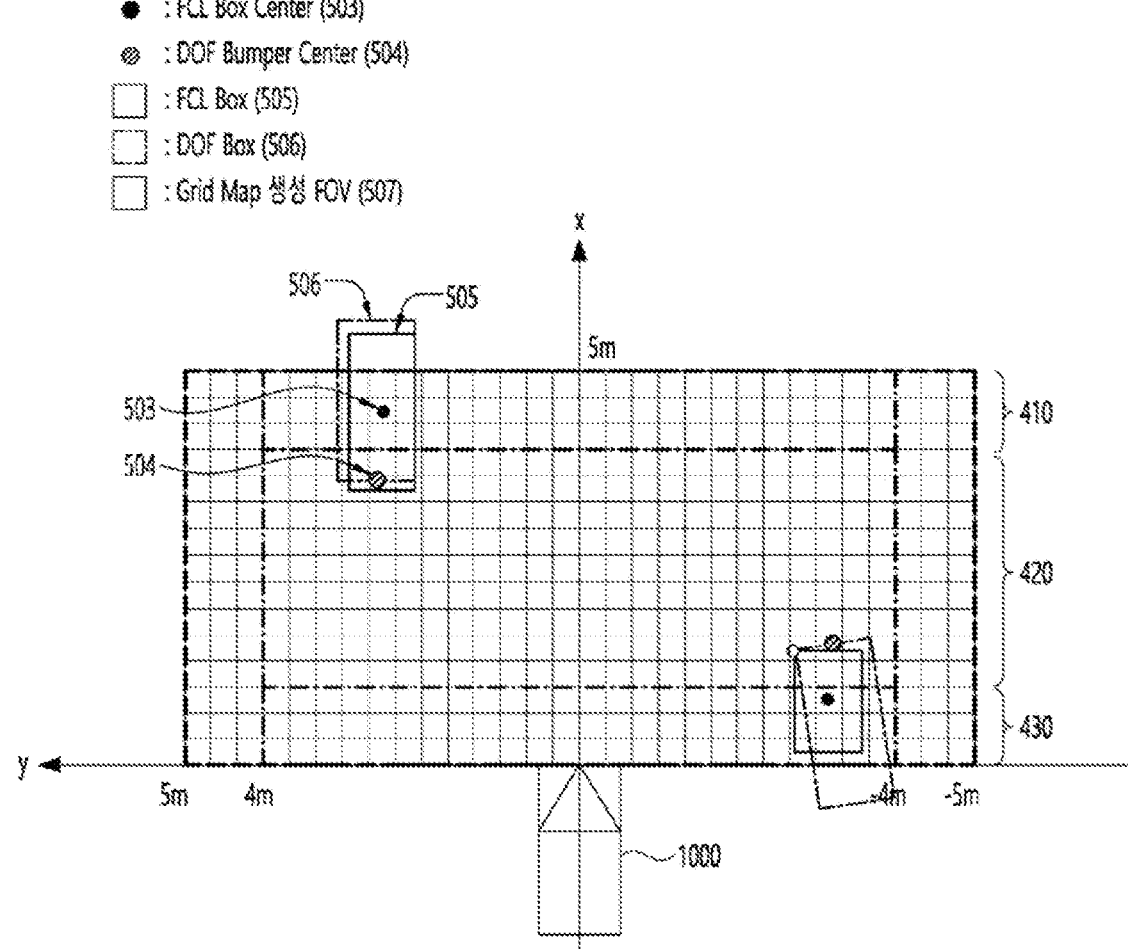
FIG. 6 is a drawing illustrating setting an FOV and a detailed operation region according to an exemplary embodiment of the present disclosure.

FIG. 6 is a diagram for describing setting an ROI or FOV and a detailed operation area according to an exemplary embodiment of the present disclosure.

Referring to FIG. 6, the apparatus 200 according to the exemplary embodiment of the present disclosure may set the FOV and the detailed operation area under the control of the processor 210.

The apparatus 200 may be configured to generate the grid map in real time while traveling, and set the ROI 400 which may be identical to the FOV of the sensor.

For example, the ROI 400 may include an area covered by the dimensions of longFOV and latFOV.

The longitudinal field of view may set a range of 0 m to 5 m, and the lateral field of view may set a range of −5 m to 5 m. In other words, the longFOV may be 5 m and the latFOV may be 10 m. A detailed description thereof has been fully described in reference to FIG. 2, and thus will be omitted.

The apparatus 200 according to an exemplary embodiment of the present disclosure may be configured to determine that the entry condition of the low-speed, short-range, cut-in, corresponding logic is satisfied when the front midpoint 507 or the rear midpoint 504 of the DOF box 506 and the midpoint 503 of the FCL (or LiDAR) box 505 are simultaneously included in the ROI 400. As described above, when the entry condition of the cut-in, corresponding logic is satisfied, the apparatus 200 may operate.

The apparatus 200 may set the ROI 400 to one or more areas 410, 420, and 430 based on the first direction under the control of the processor 210. For example, a first area 410 to a third area 430 may be defined within the ROI 400.

The first area 410 is disposed at the front-most position with respect to the first direction in the ROI 400, and may be formed to include an area length of about 1 m. For example, the first area 410 may be set in a range of approximately 4 m to 5 m based on the longFOV.

The apparatus 200 may adjust the position of a DOF box to the side of the associated FCL box 505 closest to the self-driving vehicle 1000, by use of DOF Shift Logic in the first area 410 which may be a logic of shifting the DOF box to the side thereof.

The second area 420 is disposed in rear of the first area 410 with respect to the first direction in the ROI 400, and may have the area length of about 2.75 m. For example, the second area 420 may be set in an area within the range of approximately 1.25 m to 4 m. The second area 420 may be formed between the first area 410 and the third area 430 without being overlapped.

The apparatus 200 may apply a low speed, short-range, cut-in logic in the second area 420, which is a logic to adjust the position of a DOF box differently from for the other areas 410, 430. That is, the apparatus 200 may use the reference line 408 (see FIG. 5) fitted by the RANSAC algorithm when performing a DOF Shift Logic to adjust the DOF box in the second area 420. The shift logic for the second area 420 is detailed below with reference to FIG. 7

The third area 430 is disposed closest to the self-driving vehicle 1000 with respect to the first direction in the ROI 400, and may have the longitudinal length of about 1.25 m. For example, the third area 430 may be set in an area ranging from approximately 0 m to 1.25 m along the X axis. The third area 430 may be formed between the second area 420 and the self-driving vehicle 1000. The second area 420 may be formed between the first area 410 and the third area 430.

In the third area 430, the apparatus 200 adjust the position of a DOF box so that a closest corner point of the DOF box to a longitudinally straight line passing through the cell of "1" closest to the vehicle 1000 among the cells of "1" associated with the DOF box is shifted along the Y axis to the longitudinally straight line.

The first area 410 to the third area 430 described above may be formed to have the width (−4 m to 4 m) smaller than the width (−5 m to 5 m) of the ROI 400.

Also, the ROI 400 may include a bumper area. The bumper area may be an area excluding the first area 410 to the third area 430 in the ROI.

The adjustments for the first, second, and third areas are performed under the condition that the midpoint of the front side or the rear side of the DOF box of a target object and the center of the FCL box associated therewith are both within the first, second, or third area. Also, although the midpoint and the center are both within the ROI 400, if they are out of the first, second, and third areas, the apparatus 200 may not adjust the DOF box but collect FCL contour information on the grid map.

Furthermore, the apparatus 200 may use the grid map having accumulated data of the five frames, e.g., the four previous frame and the current frame.

Furthermore, the apparatus 200 may be configured to determine whether an object enters the ROI 400 using an average value of the contour points of the object under the control of the processor 210, and may also determine whether an object is within the ROI 400 using a midpoint position of the center cell among the cells belonging to the object on the grid map.

Figure 7:
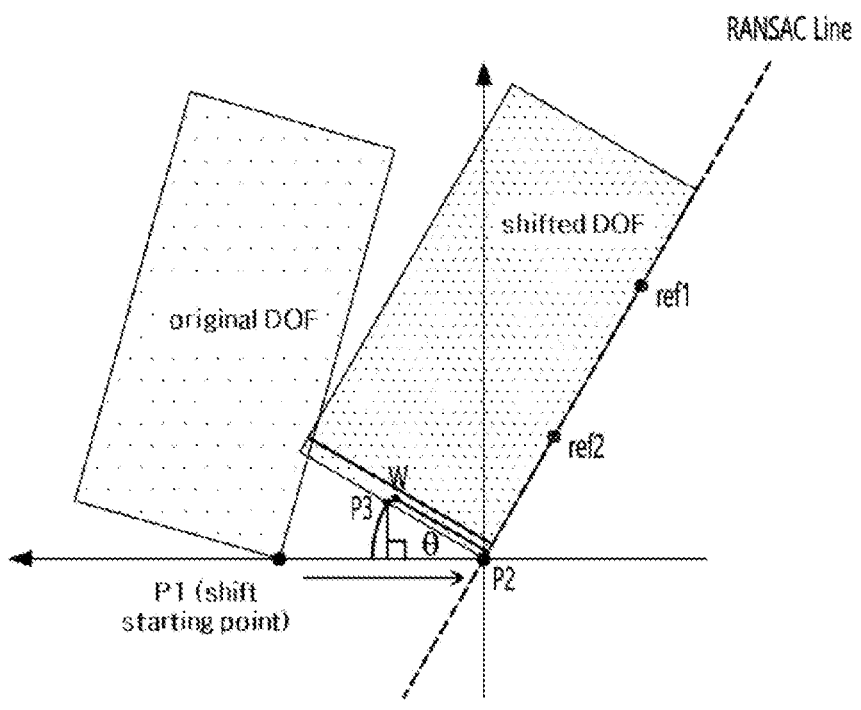
FIG. 7 is a drawing for describing a DOF track Shift Logic according to an exemplary embodiment of the present disclosure.

FIG. 7 is a drawing for describing a DOF track Shift Logic according to an exemplary embodiment of the present disclosure.

Referring to FIG. 7, the apparatus 200 according to an exemplary embodiment of the present disclosure may perform amendment or shift using DOF Shift Logic under the control of the processor 210.

First, the apparatus 200 may be configured to determine an equation of a straight line including parameters $A_{shift}$, $B_{shift}$, and $C_{shift}$ under the control of the processor 210. That is, the apparatus 200 may define the fitted reference line (RANSAC Line) by use of Equation 3 below under the control of the processor 210.

$$A_{shift} * x + B_{shift} * y + C_{shift} = 0 \qquad \text{Equation 3}$$

$$A_{shift} = y_{ref1} - y_{ref2}$$

$$B_{shift} = x_{ref2} - x_{ref1}$$

$$C_{shift} = x_{ref1} * y_{ref2} - y_{ref1} * x_{ref2}$$

wherein ref1 and ref2 denote respectively the center points of two sampling cells as described above with reference to FIG. 5.

The adjustment of the DOF box is performed by shifting the box from the original position to the reference line along the Y axis (or in the lateral direction) by moving the corner point of the box closest to the reference line in the lateral direction to the position on the reference line and changing the heading to the direction parallel to the reference line.

To the present end, for example, the apparatus 200 may be configured to determine a new position P2 on the line which is the intersection point between the reference line and the lateral line passing through the right rear corner point P1 shown in FIG. 7 under the control of the processor 210.

The apparatus 200 may be configured to determine the position P2 from the position P1 by applying Equation 4 below under the control of the processor 210.

$$x_{P2} = x_{P1} \qquad \text{Equation 4}$$

$$y_{P2} = -\frac{A_{shift}}{B_{shift}} * x_{P1} - \frac{C_{shift}}{B_{shift}}$$

Thereafter, the apparatus 200 may be configured to determine the position P3 from the position P2 as a new position of the midpoint of the rear side of the box by Equation 5 below under the control of the processor 210. Here, P3 may correspond to the center portion of the rear bumper of the target vehicle.

$$x_{P3} = x_{P2} - 0.5 * W * \sin(LineHeading) \qquad \text{Equation 5}$$

$$y_{P3} = y_{P2} - 0.5 * W * \cos(LineHeading)$$

wherein LineHeading is $\arctan(-A_{shift}/B_{shift})$.

The above-described embodiments may be implemented in a form of a recording medium for storing instructions executable by a computer. The instructions may be stored in a form of a program code, and when executed by a processor, may be configured to generate a program module to perform operations of the disclosed exemplary embodiments of the present disclosure. The recording medium may be implemented as a computer-readable recording medium.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus including a non-transitory computer-readable storage medium storing a program therein and a processor, wherein the processor is configured by executing the program, to:

generate a dynamic object fusion (DOF) box based on fusion-sensor information provided from a Light Detection and Ranging (LiDAR) sensor of a vehicle and at least one non-LiDAR sensor of the vehicle;

generate a grid map of a predetermined region of interest (ROI) with sensor information provided from the LiDAR sensor of the vehicle;

set a reference line on the grid map based on the sensor information; and adjust the dynamic object fusion (DOF) box based on the reference line.

2. The apparatus of claim 1, wherein the processor is further configured to:

generate an accumulated grid map by accumulating the grid map with LiDAR contour points included thereon for multiple time frames;

extract points of the vehicle from the accumulated grid map;

filter noise by applying a random sampling and consensus (RANSAC) algorithm to the points of the vehicle;

generate a reference line based on the points of the vehicle; and adjust the DOF box based on the reference line.

3. The apparatus of claim 1, wherein the processor is further configured to extract clustered points from the points of the vehicle using the sensor information, and control the extracted clustered points to be applied on the grid map.

4. The apparatus of claim 3, wherein the processor is further configured to cluster the points of the vehicle by each shape after preprocessing the sensor information.

5. The apparatus of claim 4, wherein the processor is further configured to perform the preprocessing by filtering and removing a point having a predetermined intensity or reflectivity through intensity or confidence information of the sensor information, and converting the sensor information to be applied on the grid map.

6. The apparatus of claim 3, wherein the processor is further configured to generate the LiDAR contour points based on the clustered points, and extract a shape of an object based on the generated LiDAR contour points.

7. The apparatus of claim 3, wherein the processor is further configured to determine a box fitted to the shape of the object, on the grid map, and then determine information related to the box including a width, a length, a position, or a heading of the box.

8. The apparatus of claim 2, wherein the processor is further configured to determine LiDAR contour points associated with the DOF box on the grid map, and input "1" to a cell including a LiDAR contour point and/or input "0" to a cell not including the LiDAR contour point.

9. The apparatus of claim 8, wherein the processor is further configured to determine a first cell having the input of "1" and firstly encountered while searching from right to left or from the left to the right for each row on the grid map.

10. The apparatus of claim 9, wherein the processor is further configured to determine a midpoint of the first cell for each row.

11. The apparatus of claim 10, wherein the processor is further configured to set a midpoint of a frontmost first cell in a longitudinal direction with respect to the vehicle as a first point, and set a midpoint of a rearmost first cell in the longitudinal direction as a second point.

12. The apparatus of claim 11, wherein the processor is further configured to determine an intermediate value using the first point and the second point and set a reference cell among first cells based on the determined intermediate value.

13. The apparatus of claim 12, wherein the processor is further configured to set a division line in a horizontal direction or a transverse direction passing through the reference cell, and set a first sampling area located in front of the division line and a second sampling area located in rear of the division line.

14. The apparatus of claim 13, wherein the processor is further configured to determine a first sampling cell in the first sampling area and a second sampling cell in the second sampling area.

15. The apparatus of claim 14, wherein the processor is further configured to set the reference line based on the first sampling cell and the second sampling cell.

16. The apparatus of claim 15, wherein the processor is further configured to set a first area of a frontmost area on the ROI, a second area disposed immediately behind the first area without being overlapped therewith, and a third area of a rearmost area on the ROI, the first, second, and third areas having smaller widths than a width of the ROI, and wherein the processor is further configured to maintain the DOF box without adjusting when front or rear center point of DOF box and a center point of a LiDAR box associated thereto is included in a remaining area of the ROI other than the first, second, and third areas.

17. The apparatus of claim 15, wherein the processor is further configured to set a predetermined area within the ROI, and perform the adjusting of the DOF box based on the reference line when front or rear center point of the DOF box and a center point of a LiDAR box associated thereto is included in the predetermined area of the ROI.

18. The apparatus of claim 17, wherein the processor is further configured to set a first area of a frontmost area on the ROI, a second area of the predetermined area disposed immediately behind the first area without being overlapped therewith, and adjust the DOF box, when the front or rear center point of the DOF box and a center point of a LiDAR box associated thereto is included in the first area, based on the LiDAR box.

19. The apparatus of claim 17, wherein the processor is further configured to set a third area of a rearmost area on the ROI, a second area of the predetermined area disposed immediately ahead of the third area without being overlapped therewith, and adjust the DOF box, when the front or rear center point of the DOF box and a center point of a LiDAR box associated thereto is included in the third area, based on a cell having the input of "1" and located closest to the vehicle.

20. A vehicle comprising an apparatus comprising a non-transitory computer-readable storage medium storing a program therein and a processor, wherein the processor is configured by executing the program to:

generate a dynamic object fusion (DOF) box based on fusion-sensor information provided from a Light Detection and Ranging (LiDAR) sensor of the vehicle and at least one non-LiDAR sensor of the vehicle;

generate a grid map of a predetermined region of interest (ROI) with sensor information provided from the LiDAR sensor of the vehicle;

set a reference line on the grid map based on the sensor information; and adjust the dynamic object fusion (DOF) box based on the reference line.

* * * * *